United States Patent [19]

Eckert et al.

[11] Patent Number: 4,524,426

[45] Date of Patent: Jun. 18, 1985

[54] ELECTRONIC POSTAGE METER CONTROLLABLE BY MAILING MACHINE

[75] Inventors: Alton B. Eckert, Norwalk; Robert B. McFiggans, Stamford, both of Conn.

[73] Assignee: Pitney Bowes Inc., Stamford, Conn.

[21] Appl. No.: 467,724

[22] Filed: Apr. 19, 1983

[51] Int. Cl.[3] .......... G06F 15/02; G06F 15/20; G06F 3/02

[52] U.S. Cl. .......... 364/900

[58] Field of Search ... 364/200 MS File, 900 MS File, 364/466

[56] References Cited

U.S. PATENT DOCUMENTS

| | | | |
|---|---|---|---|
| 3,938,095 | 2/1976 | Check, Jr. et al. | 364/900 |
| 3,978,457 | 8/1976 | Check, Jr. et al. | 364/200 |
| 4,093,999 | 6/1978 | Fuller et al. | 364/900 |
| 4,097,923 | 6/1978 | Eckert, Jr. et al. | 364/900 |
| 4,251,874 | 2/1981 | Check, Jr. | 364/900 |
| 4,301,507 | 11/1981 | Soderberg et al. | 364/900 X |
| 4,310,754 | 1/1982 | Check, Jr. | 364/464 X |
| 4,421,977 | 12/1983 | Kittredge | 364/900 |
| 4,422,148 | 12/1983 | Soderberg et al. | 364/900 |
| 4,471,440 | 9/1984 | Check, Jr. | 364/466 |

*Primary Examiner*—Harvey E. Springborn
*Attorney, Agent, or Firm*—David E. Pitchenik; Albert W. Scribner; William D. Soltow, Jr.

[57] ABSTRACT

An electronic postage meter system includes a postage meter in a secure housing enclosing only an electronic accounting system having registers and a printer. All control for the postage meter is effected by way of a connector on the housing for connecting a mailing machine or service unit to the postage meter. In operation, a sole input to the meter is by way of a keyboard of the mailing machine and a sole signal output is to the mailing machine, for example, to a display. The postage meter has a program to continuously read out its registers to the connector upon an initial application of power to the connector and a service unit which may be adapted solely to display such signals.

16 Claims, 11 Drawing Figures

ELECTRONIC POSTAGE METER CONTROLLABLE BY MAILING MACHINE

This invention relates to electronic postage meters, and is particularly directed to the provision of an electronic postage meter and postage meter system wherein the reliability of the postage meter is enhanced, and the expense thereof is reduced to a minimum.

Electronic postage meters are disclosed, for example, in U.S. Pat. Nos. 3,938,095; 3,978,457; 4,251,874; and 4,301,507 assigned to the assignee of the present application, and U.S. Pat. No. 4,093,999. Such postage meters are designed to be substantially "Self-Contained" devices, i.e. having keyboards for entering data and displays for displaying postage meter information integrated therewith.

In the provision of such a complete or substantially complete electronic postage meter, it is necessary to provide access for the input and output devices, such as the keyboard and display, extending through the EMI shield of the postage meter. In order to inhibit compromising the security of the postage meter as a result of provision of such access, it is of course necessary to specifically design the EMI shield and other components of the postage meter such that the accounting registers within the secure housing cannot be altered by way of such access, for example by external electromagnetic fields.

The requirements for providing such security for the postage meter, in view of the provision of access for the keyboard and display, necessarily increases the cost of the postage meter, as well as its size and weight. The design of the postage meter to include the control functions for such devices as a display and keyboard also generally entails the incorporation, within the secure housing, of numerous components that do not require the same high degree of security as for example, the printer and accounting system. Accordingly, in prior electronic postage meters, the secure housing has generally been made sufficiently large to incorporate such non-secure functions, thereby also increasing the cost, size and weight of the postage meter. Such an arrangement also disadvantageously includes costly elements in the postage meter, which is usually a rental device, rather than in the mailing system, which is usually purchased by the user.

The incorporation of components not requiring security within the confines of the secure housing leads to the additional disadvantage of complicating service. Service of the internal components of a postage meter must be effected by specific personnel, such as representatives of the manufacturer in specific secure facilities. Consequently, repair cannot be effected by a user, or even a manufacturer's representative, on customer premises, thereby increasing the service costs for the device. In order to minimize such increased service costs, it has been the practice to over-design all components within the secure housing, even those not requiring security, to minimize any possibility of failure. Such design also increases the cost and size of the postage meter.

The present invention is therefore more specifically directed to the provision of a postage meter and postage meter system that overcomes the above disadvantages of known electronic postage meters, wherein the electronic postage meter is comprised of a secure housing that encloses, substantially only, a printer and an electronic accounting system. The electronic accounting system, preferably microcomputerized, includes accounting registers. Contrary to the practice generally employed in prior electronic postage meters, the postage meter itself does not have a keyboard or a display. The sole input and output paths for data is by way of a connector on the secure housing. In addition, the power for the postage meter is also preferably applied by way of this connector.

A basic postage meter of this type is disclosed in U.S. Pat. No. 4,251,874, wherein the control for the postage meter may be effected by means of a mailing machine, incorporating a keyboard for applying data corresponding to postage to be printed to the connector of the postage meter, and a display for displaying the postage meter information. The mailing machine may of course have additional conventional functions, such as mail feeding, mail weighing, and mail calculation functions.

In the arrangement of the invention, the components actually provided within the secure housing are only those components that require security, so that the size and hence cost of the postage meter is minimized. There is hence no necessity to provide overdesigned components, for use in the postage meter, for functions that do not require security. In addition, service requirements for the postage meter are minimized, in view of the minimization of components within the postage meter itself.

In a preferred embodiment of the invention the postage meter has a program that continuously serially outputs the contents of the registers thereof to the connector, upon the initial application of operating power to the connector, until a determined control signal is received at the connector from an external device. This enables the reading of the registers of the postage meter in a simple manner, and the use of a simple service unit. The service unit for reading the registers may hence be comprised simply of a source of operating power for the postage meter, a display, and means for converting the output signals from the postage meter for display on the display means.

In order that the invention will be more clearly understood, it will now be disclosed in greater detail with reference to the accompanying drawings, wherein.

Figure 5:
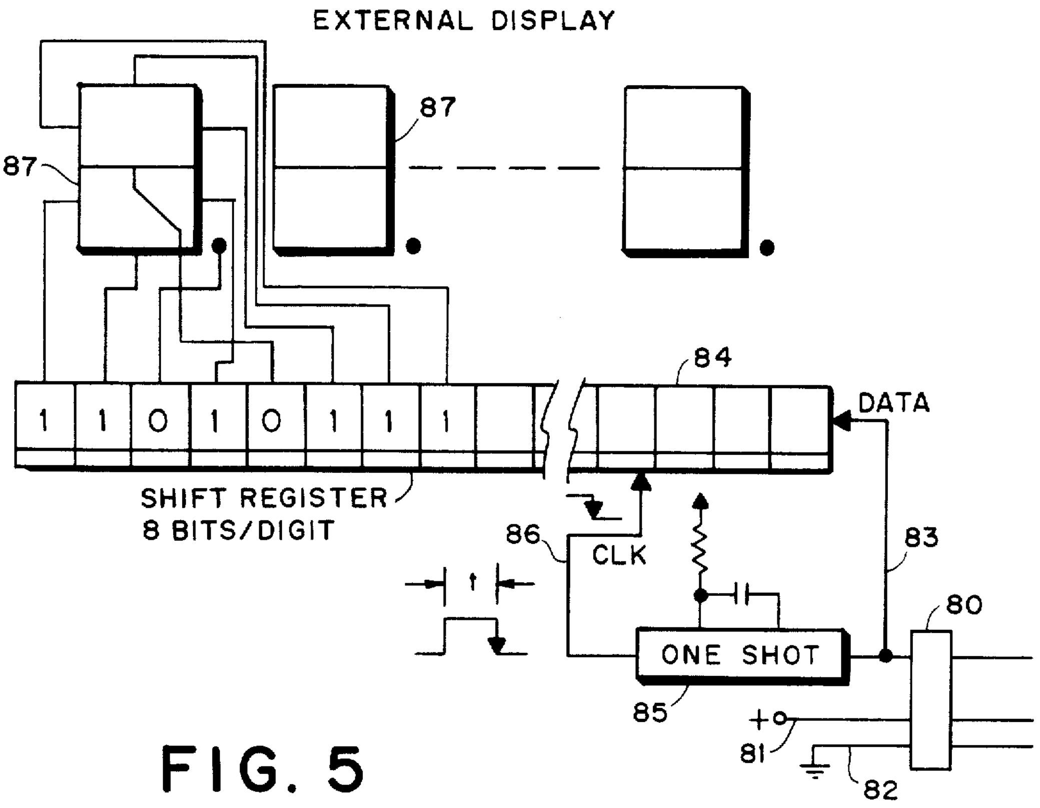
FIG. 5 is a simplified block diagram of one display system in accordance with the invention.
Figure 8:
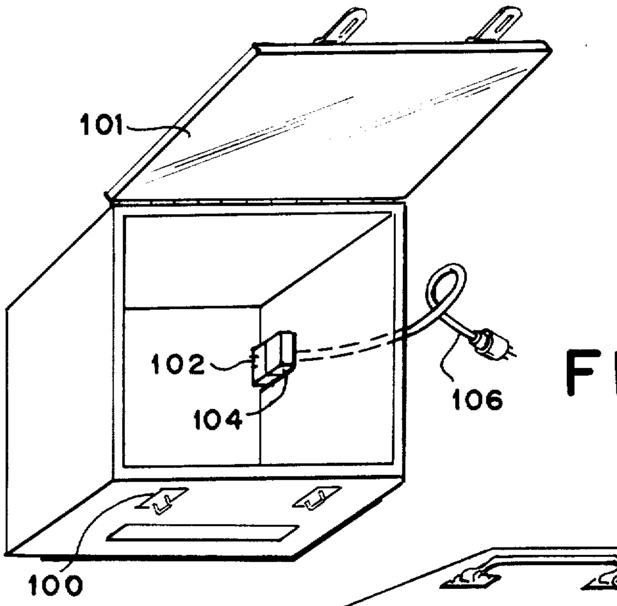
Figure 9:
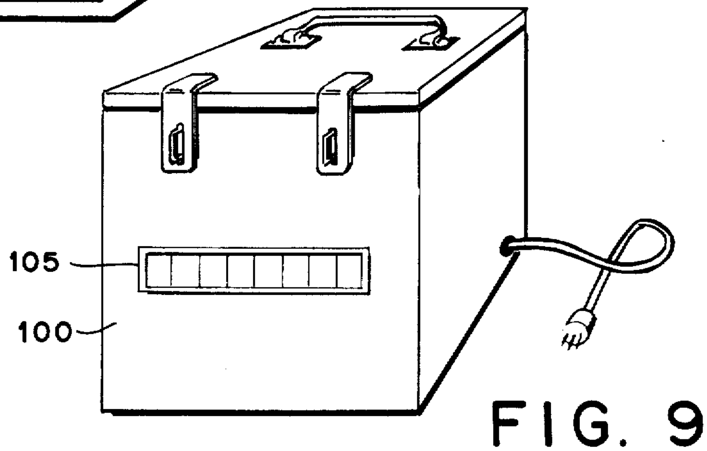
Figure 7:
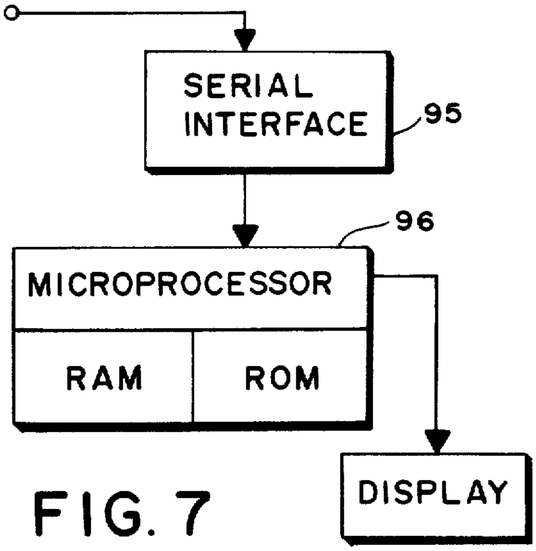

FIG. *6a–6c* are simplified illustrations of a display as it may appear in the device of FIG. 5;

FIG. 7 is a simplified block diagram of a modification of the display device;

FIG. 8 is a perspective view of a container case for the postage meter, with the lid open, and FIG. 9 is a perspective frontal view of the carrying case of FIG. 8 with the lid closed.

Figure 1:
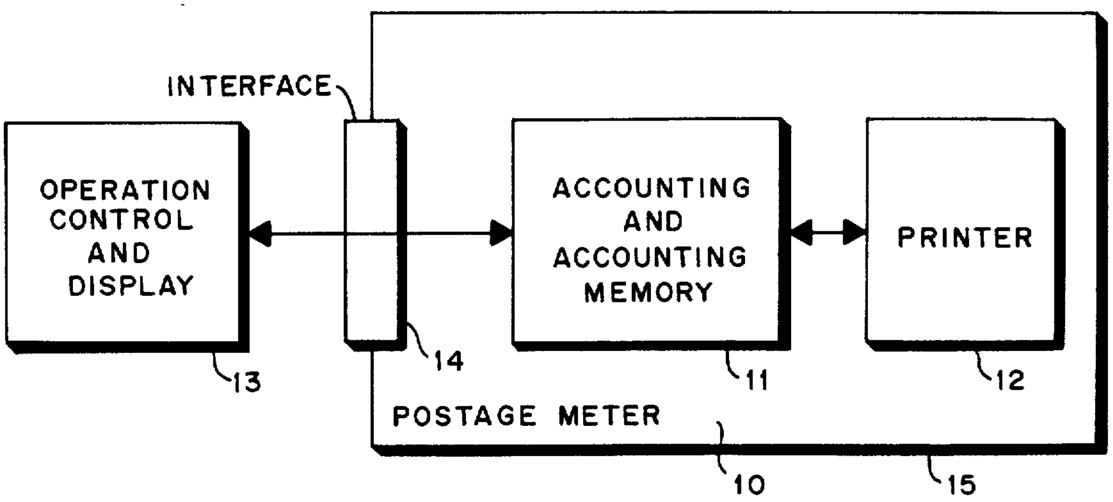
FIG. 1 is a simplified block diagram of a postage meter in accordance with the invention.

Referring now to the drawings and in particular to FIG. 1, therein is illustrated the essential organization of a postage meter system in accordance with the invention. The postage meter 10 includes only those elements whose functions require security, i.e., the accounting and accounting memory 11 and the postage printer 12. The postage meter is completely controlled by an external operation control and display device 13 which provides the sole source of data and control signals for the postage meter. In addition, if a display is provided it is provided on the control unit 13. The control unit 13 may advantageously be a "mailing machine", herein defined as a device or system serving one or more functions in the processing of mail, aside from those of accounting and printing by the meter itself, such as receiving and/or calculating the correct postage to be applied to a given piece of mail, feeding the mail to and from the postage meter itself for having postage printed thereon, as well as initiating the printing operation. The calculations of the postage to be applied may be determined by conventional weighing devices, or calculators may be employed for calculating on the basis of different types of mail, the destination of the mail, and different surcharges. Alternatively, of course, the operation control and display device 13 may have a manually operable keyboard for inputting an amount corresponding to the postage to be applied to the mail.

The operation control and display 13 communicates with the meter per se by way of an interface 14 adapted to ensure the security of accounting data stored in the postage meter. For example, the interface 14 may be comprised of optical couplers (except for power leads), such as disclosed, for example, in U.S. Pat. No. 4,310,754 issued Jan. 12, 1982, and assigned to the present assignee, whereby any electrical or mechanical tampering of the postage meter necessarily leaves physical evidence of the tampering if interference with the accounting data has been actually effected.

The arrangement of the present invention, as illustrated in FIG. 1, thereby minimizes the equipment provided within the postage meter itself, i.e., within the secure housing 15 enclosing the accounting and accounting memory 11 and printer 12. The minimization of equipment within the postage meter provides numerous advantageous results. Thus, the postage meter may consequently be made smaller, thereby greatly simplifying the problem of providing a secure housing for the postage meter, and enabling a significant reduction in the cost of the secure housing. In addition, the reduction in size and weight of the printing meter, by removal therefrom of devices directed to non-secure functions, renders the postage meter much more portable, so that it may be more easily transported, for example, to a post office for recharging.

In conventional electronic postage meters, such as disclosed, for example, in U.S. Pat. No. 3,978,457, various devices such as a keyboard and a display are provided on the postage meter. In order to employ such peripheral devices in the postage meter, it is hence necessary to establish transmission paths between these peripheral devices and the central processor of the postage meter. In order that these transmission paths do not compromise the integrity of the postage meter, it is necessary to specially design the postage meter such that any communication paths or aperture in the secure housing be designed to inhibit access to the accounting units of the postage meter. Such design necessarily increases the cost and complexity of the postage meter.

In accordance with the present invention, however, as shown in FIG. 1, since the functions of the display and keyboard are provided in the external unit, it is now necessary to provide only a single secure communication path to and from the postage meter.

As described in U.S. Pat. No. 4,301,507 from the standpoint of security it is desirable to minimize the number of transmission paths, such that, for example, the entire communication between the postage meter and the external control device is by way of a single two way two line communication path. The communication with the postage meter of this invention is hence preferably serial asynchronous communication, on a bit by bit basis. The communication technique employed herein also advantageously includes retransmission of received data, and the transmission of no-error pulses between the pulse groupings, verifying correct transmission, such as described in U.S. Pat. No. 4,301,507.

The minimization of functions of the postage meter itself provides a still further advantage from the standpoint of serviceability and reliability. The reduction of components and the functions served thereby within the postage meter of course increases the reliability of the postage meter, and decreases the necessity for servicing such components within the secure housing. The systems thus removed from the postage meter are more accessible when they are located within the mailing machine itself, and hence can be more easily serviced. The servicing of such a system hence can be more readily and more economically effected by less skilled personnel than was necessary to service the systems when they were within the secure housing of the postage meter. The user of the postage meter may hence have fuller control over the servicing of the mailing machine, the increased reliability of the postage meter per se thereby minimizing the necessity of access to the postage meter. This results in the possibility of design of the mailing machine with less consideration given the accessibility of the postage meter itself for operation, service or for its mobility for recharging purposes. The postage meter then may hence be "buried" within the mailing machine, so that it is in fact not externally accessible during normal use of the mailing machine.

Figure 2:
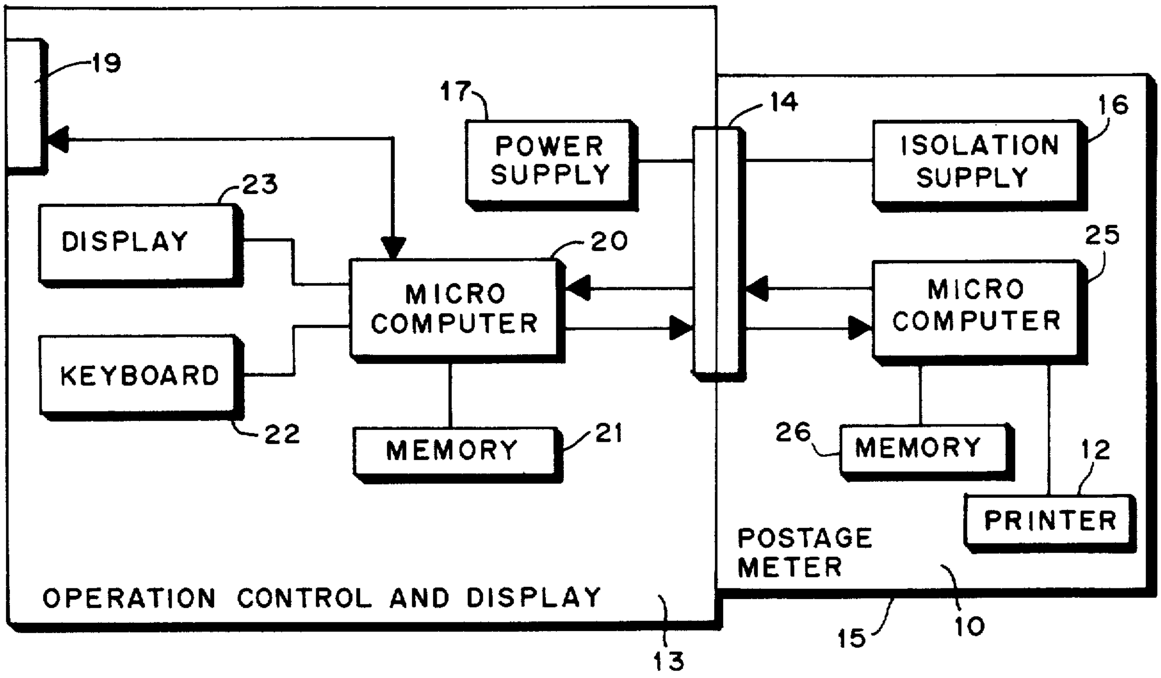
FIG. 2 is a more detailed block diagram of a postage meter system in accordance with the invention.

In a further extension of the system of FIG. 1, as illustrated in FIG. 2, the postage meter 10 is also provided with an isolation power supply system 16, which may also be within the secure housing. This enables the postage meter to be supplied from an external power supply source 17, for example, in the mailing machine. The isolation supply may have conventional circuits inhibiting the application of over-voltage, voltage spikes or under-voltage to the postage meter. The isolation supply may be of any one of a number of designs, for example, a high frequency switching power supply may be employed for this purpose. Since the provison of any power to the meter requires access through the secure housing, it is of course essential that tampering, for example, applying excess voltage from the power supply, cannot affect the integrity of the accounting memories within the system. The internal isolation supply must hence prevent the passing of such over-voltages to the memory portion of the postage meter.

As a result of the use of the isolation supply, it is hence apparent that the operating current for the postage meter may be supplied by the mailing machine. As a consequence, it is even unnecessary to provide an on-off switch in the postage meter, this function being easily served by control of the mailing machine itself.

It must of course be pointed out that it is essential, in accordance with the present invention, to retain both the printer and the accounting system within the secure housings of the postage meter. Separation of the printing function renders the printer itself subject to tampering, thereby multiplying the security requirements since security must then be provided to ensure that the printer can be controlled effectively only by way of secure signals from the accounting unit.

Referring again to FIG. 2, it is evident that the interface 14 enabling passage of signals to and from the postage meter, upon removal from the mailing machine, is externally accessible, and hence subject to tampering. In accordance with the invention it is only necessary to ensure security of this interface from effects that would result in the loss of accounting data in the memory, such as may occur, for example, by mechanical tampering or the application of excess voltage. The application of signals of the postage meter of the type that would be normally applied by the mailing machine does not constitute a problem, since if any postage is in fact printed as a result of such applications of signals to the meter, an accounting will in fact be made of such printing.

Referring again to FIG. 2, the interface 14 may form a removable interconnector between the mailing machine and the postage meter, enabling the ready removal of the postage meter from interconnection with the mailing machine. The connector may be adapted to simultaneously supply power from the power supply 17, as well as interconnecting the signal channels. In this embodiment of the invention, a microcomputer 20 is provided within the mailing machine, having a memory 21 and keyboard 22 or other data input, and a display 23 connected thereto. The postage meter 10 may have a separate microcomputer 25 with an accounting memory 26, for example a non-volatile memory, and a printer 12 connected thereto.

The postage meter system illustrated in FIG. 2 may be recharged in a number of different manners. The process of recharging refers to the adjustment of the registers of the meter to increase the postage that the meter is authorized to dispense. In one recharging technique, the postage meter may be recharged without disconnection of removal from the mailing machine. If the mailing machine is provided with a keyboard in this recharging technique, the microcomputer 25 has stored therein a pseudo-random number sequence corresponding to a pseudo-random sequence stored at the location of the postal authorities, so that obtaining the next number of the sequence from the postal authorities and entering it into the keyboard enables the postage meter to recharge itself either to a fixed sum or to a sum subsequently entered into the keyboard. This type of recharging is disclosed, for example in U.S. Pat. No. 4,097,923. With this type of recharging it is evident that there is seldom any need for disconnecting the postage meter from the mailing machine.

As an alternative, of course, the postage meter may be removed for recharging at a post office employing, for example, a system duplicating the necessary portions of the mailing machine as illustrated in FIG. 2.

It may on occasion be necessary to check the condition of the postage meter, for example, to read the registers therein independently of the mailing machine to ensure that they correspond to the correct reading as established by the postal authorities. For this purpose, a serviceman may be provided with a control system having the functions of the operation control and display 13 of FIG. 2. The programs of the microcomputers 20 and 25 enable interrogation of the memory 26 of the postage meter, so that selected contents thereof may be read on the display 23.

The operation control and display 13 may also include an interface 19 to enable external control.

Figure 3:
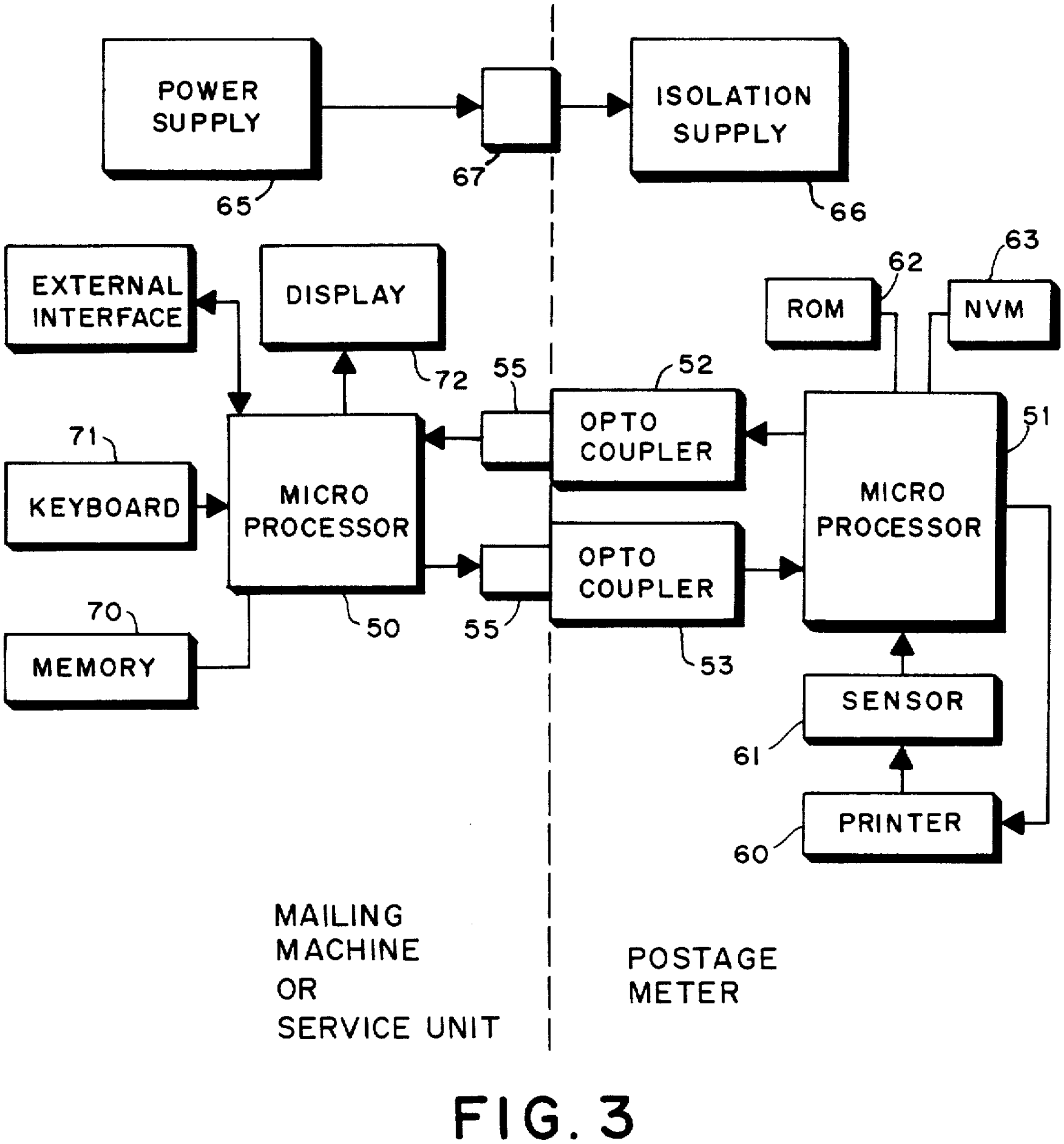
FIG. 3 is a block diagram of the combination of a postage meter and mailing machine in accordance with the invention.

A more complete block diagram of a postage meter system in accordance with the embodiment of the invention is illustrated in FIG. 3. In this embodiment of the invention, the microprocessor 50 of the mailing machine or service unit is coupled to the microprocessor 51 of the postage meter by way of optocouplers 52 and 53 connected for signal transfer in opposite directions between the microprocessors. These signal paths are serial signal paths, the microprocessor preferably being programmed to transfer asynchronous serial messages on a bit-by-bit basis, such as disclosed, for example, in U.S. Pat. No. 4,301,507 issued Nov. 17, 1981. Connectors 55 enable separation of the postage meter and the mailing machine, the connectors 55 being of conventional design. The optocouplers 52 and 53 as above discussed inhibit the application of voltages to the microprocessor 51 that may damage the microprocessor or the memory units coupled thereto.

The postage meter also includes a printer 60 which may be controlled in a conventional manner by the microprocessor 51 and a sensor 61 coupled to apply data to the microprocessor 51 corresponding to the current setting position of the printer. A program memory (e.g. Rom) 62 is coupled to the microprocessor for controlling the operation thereof, in accordance with the desired programs, and data, such as accounting data, is stored in a non-volatile memory (NVM) 63. The power supply 65 of the mailing machine is connected to apply power to the isolation supply 66 of the postage meter, for example, by way of connector 67, which, as discussed above, forms a part of the same conventional connector 55. The isolation supply 66 supplies the power for the operation of the microprocessor 51 and its peripherals, as well as for driving the printer 60. The mailing machine includes a memory 70 coupled to the microprocessor 50, the memory 70 including program memory as well as temporary working memory. A signal input, such as keyboard 71, is coupled to the microprocessor 50 for entering information concerning the amount of postage to be printed, as well as optionally various other data such as recharge data. It is of course apparent that alternate inputs may be coupled to the microprocessor 50, such as, for example, weighing machines or the like. In addition, a display 72 is coupled to the microprocessor for displaying, for example, the postage being printed. The program memory 70 of the microprocessor may also enable keyboard requests which in turn enable the display of the contents of the registers of the postage meter on the display 72.

Since the postage meter in accordance with the invention only serves a minimum number of functions, i.e., only those functions which must be well protected against tampering, the postage meter is of a simple design that is adaptable to use in different types of mailing machines, thereby reducing the cost of the postage meter by enabling standardization of a simple unit for a large number of applications.

When a postage meter is put into service, or is removed from service, a manufacturer's representative must be present in order to record the register readings of the postage meter. It is apparent that the service unit of FIG. 3 described above can be readily used by a manufacturer's representative in the reading of the registers, without the necessity of complex or expensive equipment, obviating thereby the requirement of direct displays on the postage meter itself.

Postal inspectors, on the other hand, are primarily concerned with the inspection of the postage meters to determine if there has been tampering or damage to a meter. Postal inspectors are of course also concerned with register readings and, as discussed above, these may be easily and economically obtained by the use of a simple service unit.

Figure 4:
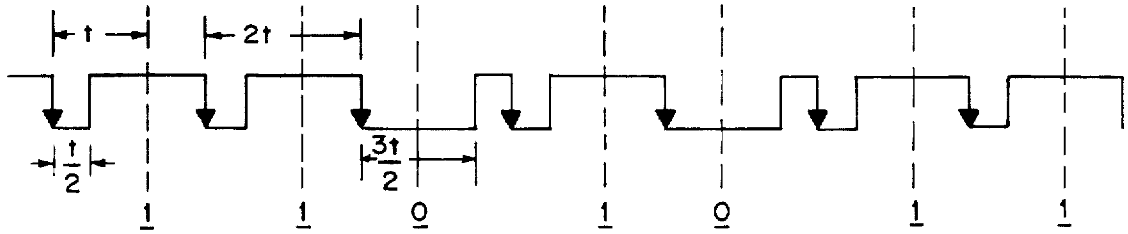
FIG. 4 is a diagram of signals that may be output from th postage meter of the invention.

FIG. 4 illustrates, in a simple manner, a serial coding of output signals that may advantageously be employed, in accordance with the invention, for enabling readout of the registers of the postage meter for display in the simple service unit described above, as opposed to the normal service unit or mailing machine. As discussed above, the serial signals are continuously applied to the transmission path output of the postage meter upon application of power thereto, until an input signal is received by the postage meter, for example, from the keyboard of the mailing machine. In the coding system illustrated in FIG. 4, the high-to-low transitions of the signal are synchronizing instants. The level of the signals at determinate times following synchronizing transitions, corresponds to the true data level. Thus, in the signal illustrated in FIG. 4, the data at the sampling instants is 11010111. Suitable coding may of course be employed for distinguishing the outputs from the different registers of the postage meter.

The continuous serial output signal from the meter may be advantageously employed, in another embodiment of the invention, to enable the readout of the registers of the meter in a simple and economical manner.

For example, as illustrated in FIG. 5, a connector 80 is adapted to be coupled to the connector of the postage meter. Lines 81 and 82 from the connector serve to supply operating power for the service unit. The data on line 83 is applied, as an input, to a shift register 84. The serial signals are also applied to a one shot 85 responsive to the negative transitions of the input signal to produce output clock signals on line 86 for clocking the shift register. A plurality of seven-segment displays 87 are coupled to the shift register, for example, with each successive group of eight shift register states being coupled to the different segments and decimal of a separate display.

Referring again to FIG. 4, assuming that the cycle time of a signal is 2t, then it is apparent that the time of occurrence of the valid output level is a time t following the negative signal transition. Thus, the one shot 85 produces an output pulse of time duration t, to clock the shift register, in this case with a negative transition at each time of valid signal entry.

Assuming that the display is to be ten characters wide, then the shift register 84 will be 80 bits wide. Upon power up, the meter immediately outputs 80 bits representing the elements to be visible in the ten displays. When 80 bits have been shifted out, the output pauses for several seconds, in order to enable an operator to read the display visually. As will be discussed in the following paragraphs, the first eight bits may represent a special character identifying which of the registers in the postage meter is being output. After the pause of several seconds, a second series of 80 bits may be output from the postage meter, representing a second register with its own separate identifier. After a further pause, a third register, or possibly the first register again, may read out.

The simple service unit illustrated in FIG. 5 is adapted only to read out the registers of the postage meter, since it is provided with no facilities for inputting a signal to the postage meter.

A service unit of the type illustrated in FIG. 5, employing signals of the type discussed with respect to FIG. 4, permits the use of a simple read only internal display, without inhibiting, alternatively, the use of a more sophisticated controlling device. A continuous output of the signals in the above matter enables readout of the registers in a simple device that does not require hard wired latches. The read only display can readily enable the readout of a plurality of registers of the postage meter. In addition, the system is self-correcting and synchronizing. Even if the first signal sent out from the postage meter is unsynchronized, all subsequent signals transmitted from the postage meter will result in a correct output display and an indication of the correct register.

Figure 6A:
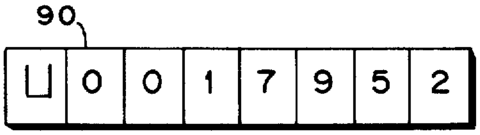
Figure 6B:
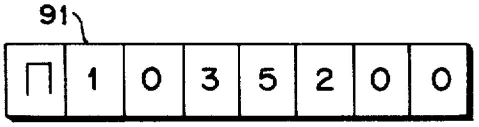
Figure 6C:
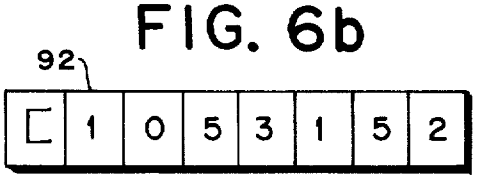

In order to enable determination of which register is being displayed, the display may include distinctive indicia. For example, as illustrated in FIG. **6*a*, the first digit 90 of the display may have a "U" character, indicating an ascending register. Following this, the first digit 91 of the display may have an inverted "U" display, indicating that the register being displayed is the descending register. In the next display, as illustrated in FIG. 6*c***, the initial digit may be in the form of a "C," indicating the display of the control sum, or sum of the ascending and descending register values.

In a modified form of display unit, as illustrated in FIG. 7, the serial signals are applied by way of a serial interface 95 to a microcomputer 96 including a microprocessor and conventional ROM and RAM, preferably integrated therewith. The microprocessor is coupled to a suitable display, for example of the type illustrated in FIGS. **6*a*, 6*b*, and 6*c*, the ROM of the microcomputer being programmed to decode the serial signals applied thereto for display in the format illustrated in FIGS. 6*a*-6*c***.

The display unit of FIGS. 5 or 7 may advantageously be employed in a portable container 100, as illustrated in FIGS. 8 and 9. The container 100 may thus constitute a carrying case for the postage meter, having a lid 101, and an internal plug 102 adapted to be coupled to the connector of the postage meter. The container also includes a circuitry unit 104 such as illustrated in FIGS. 5 or 7 and an externally visible display 105. If desired, the power for the display device or carrying case may be obtained by way of an external power plug 106. The systems of FIGS. 5-9 hence enable the economical reading of the registers of the meter, which may also serve as a carrying case for the postage meter.

While the invention has been specifically disclosed with reference only to postage meter, it will be apparent that the invention is also adaptable to similar equipment, such as tax meters, parcel service registers, etc., and it is intended to include such devices within the scope of this invention.

While the invention has been disclosed and described with reference to a limited number of embodiments, it will be apparent that variations and modifications may be made therein, and it is therefore intended in the following claims to cover each such variation and modification as follows within the true spirit and scope of the invention.

What is claimed is:

1. A portable postage meter device comprising an electromagnetically secure housing, a postage accounting system having a register and a postage printer coupled thereto within said housing, port means on said housing and comprising the sole external access to enter data in and read data from said accounting system, said port means comprising means inhibiting application of voltages directly to said accounting system from external of said housing, said port means further comprising separable intercoupling means for intercoupling said device with an external device, and serial signal transmission means in said housing for transferring signals between said port and said accounting system solely by serial coded signals, and means responsive to a determined first condition for continuously applying data corresponding to the contents of said register to said port means.

2. The portable postage meter device of claim 1 wherein said intercoupling means comprises optical coupling means whereby voltages that may damage the accounting system cannot be applied thereto from externally of said housing.

3. The portable postage meter of claim 1 further comprising means responsive to a second condition for inhibiting said continuous application of data from said register and enabling entry of data from said external source by way of said port means.

4. The portable postage meter device of claim 3 wherein said port means comprises opto-electric coupling means.

5. The portable postage meter device of claim 3 wherein a display is provided as part of said external device which constitutes the sole display coupled to the postage meter device.

6. The portable postage meter device of claim 1 wherein said postage accounting system comprises the sole element serving active postage meter functions within said secure housing.

7. A portable electronic postage meter device comprising an electromagnetically secure housing enclosing an electronic postage meter accounting system and a postage printer coupled thereto, port means on said housing and operative to enable data and control signal communication between said accounting system and external devices, and comprising a separable coupling and means inhibiting application of electric voltages to said accounting system from externally of said housing that may damage said accounting system, said accounting system comprising a register containing postage meter data and a program with a routine for repeatedly applying serially coded signals corresponding to the data in said register to said port means under predetermined conditions.

8. The portable electronic postage meter device of claim 7 comprising means for applying operating power to said accounting system, said routine continually applying said signals corresponding to the data in said register to said port means upon the application of power to said accounting system until a predetermined condition occurs.

9. The portable electronic postage meter device of claim 8 wherein said predetermined condition comprises the application of a message from an external device by way of said port means.

10. The portable electronic postage meter device of claim 9 wherein said accounting system comprises a further register containing a said control signal, said program routine sequentially applying said data from said first mentioned register and said control signal from said further register to said port means.

11. In an electronic postage meter comprising a secure housing enclosing an electromagnetically printer and an electronic accounting system connected thereto, said accounting system including a microcomputer control system, register means coupled thereto for storing postage meter data, and memory means for storing programs for controlling said microcomputer control system; the improvement comprising a connector on said housing and coupled to said microcomputer control system for enabling separable interconnection of a peripheral device to said postage meter, said memory means having a program for continuously applying data corresponding to the data stored in said registered means to said connector upon initial application of operating power to said postage meter, and means responsive to a predetermined external signal applied to said connector for enabling said postage meter program in said postage meter.

12. The electronic postage meter of claim 11 wherein the postage meter includes means for enabling application of electrical power thereto solely by way of said connector.

13. The electronic postage meter of claim 11 wherein said microcomputer control system is coupled to said connector by way of a two-way serial communication path that constitutes the sole communication path to said control system from externally of said postage meter.

14. The electronic postage meter of claim 13 wherein said communication path to said connector constitutes the sole path for inputting of control and data information to said microcomputer control system and determines the data stored in said register means.

15. The electronic postage meter of claim 14 wherein electric operating power is applied to said postage meter solely by way of said connector, whereby said program for continuously applying data to said connector is enabled upon the applying of operating power to said connector.

16. The electronic postage meter of claim 11 wherein said peripheral device includes connector means connectible to said connector, means for applying power to said connector means for application to said postage meter, and means responsive to receipt of data applied to said connector for displaying the contents of said register means.

* * * * *